W. H. McGOWEN.
TIRE.
APPLICATION FILED OCT. 17, 1919.

1,341,656. Patented June 1, 1920.
2 SHEETS—SHEET 1.

WITNESSES
R. B. Rousseau
C. E. Trainor

INVENTOR
W. H. McGowen.
BY
ATTORNEYS

W. H. McGOWEN.
TIRE.
APPLICATION FILED OCT. 17, 1919.
1,341,656.
Patented June 1, 1920.
2 SHEETS—SHEET 2.
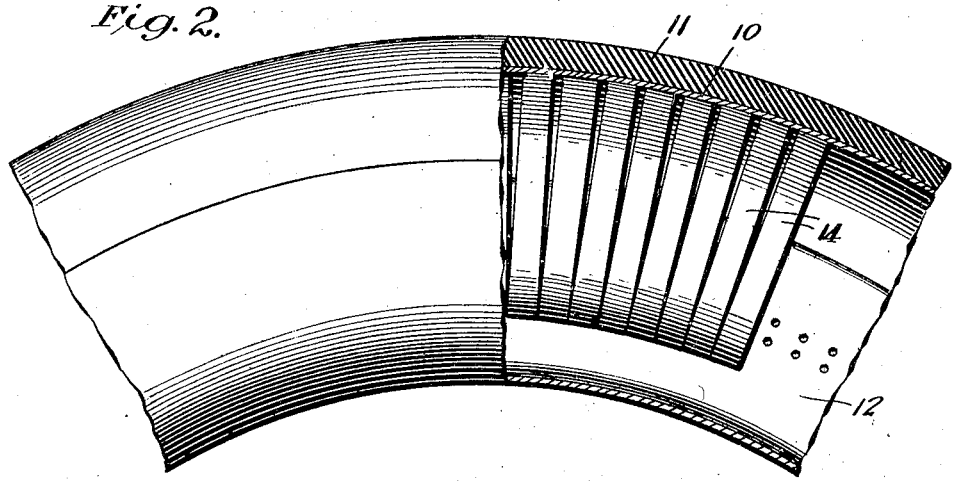
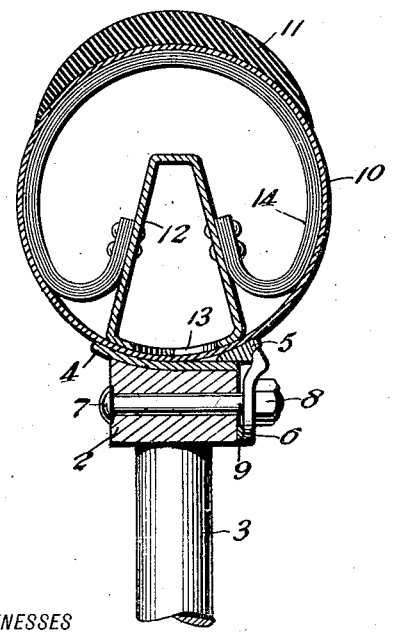
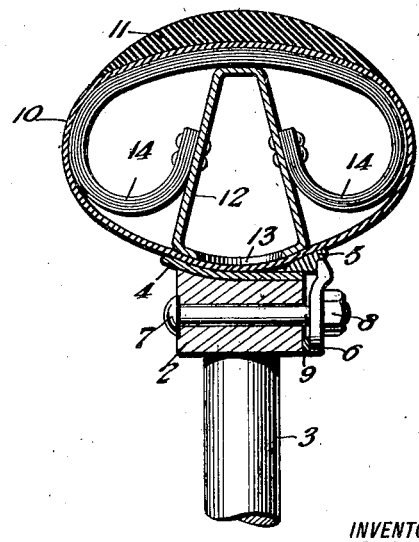
WITNESSES
INVENTOR
W. H. McGowen,
BY
ATTORNEYS

UNITED STATES PATENT OFFICE.

WILLIAM H. McGOWEN, OF VINCENNES, INDIANA.

TIRE.

1,341,656.      Specification of Letters Patent.      Patented June 1, 1920.

Application filed October 17, 1919. Serial No. 331,390.

*To all whom it may concern:*

Be it known that I, WILLIAM HERSCHEL McGOWEN, a citizen of the United States, and a resident of Vincennes, in the county of Knox and State of Indiana, have invented certain new and useful Improvements in Tires, of which the following is a specification.

My invention is an improvement in tires, and has for its object to provide a tire having a resiliency approximating that of a pneumatic tire, without the faults of the said tire, in that the tire is not subject to blowouts from punctures.

In the drawings:

Fig. 2 is a side view of a portion of the tire, with a part in section;

Figs. 3 and 4 are radial sections, showing the parts in different positions;

Figure 1:
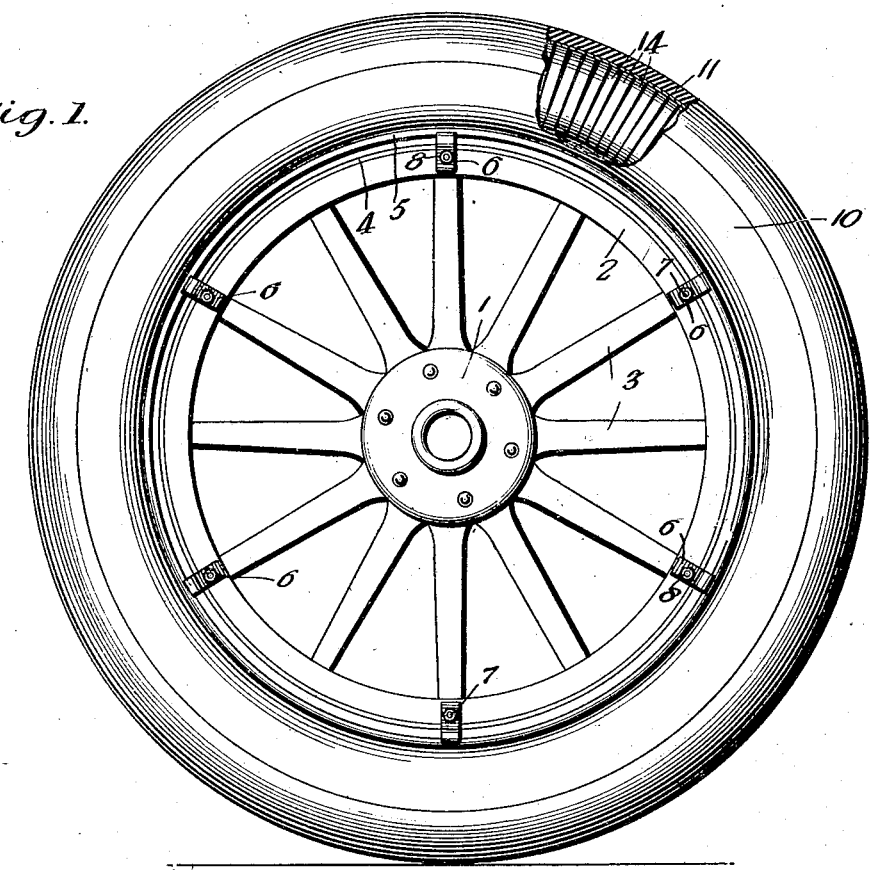
Figure 1 is a side view of the tire in place, with parts broken away.

The present embodiment of the invention is shown in connection with a wheel comprising the hub 1, the felly 2 and the spokes 3 which connect the hub to the felly. A metal rim 4 is arranged on the felly, the said rim being of greater diameter at one edge than at the other and being slightly concave on its outer face, as shown.

The outer face of the felly is curved to fit the rim, and at the edge which is nearest the center of the wheel a retaining ring 5 is provided, coöperating with the rim to hold the tire to be presently described in place. This retaining ring is held in place on the rim by locking lugs 6 which are secured to the felly by bolts 7 and nuts 8. The retaining ring has an annular recess in its outer face as shown, and this recess is engaged by the free-ends of the locking lugs.

A spacer 9 is arranged between the inner end of each locking lug and the felly, and it will be evident that when the nuts are loosened the lugs may be swung out of position to engage the retaining ring to permit the removal of the said ring and the removal of the tire.

The improved tire comprises a shoe or casing 10 of suitable material, as, for instance, laminated fabric and rubber vulcanized, the said casing being a tubular casing and having a tread 11 of rubber or the like of considerable thickness. This shoe or casing is of the ordinary type of shoe or casing, but instead of depending upon compressed air for inflation, springs are arranged within the casing.

Figure 5:
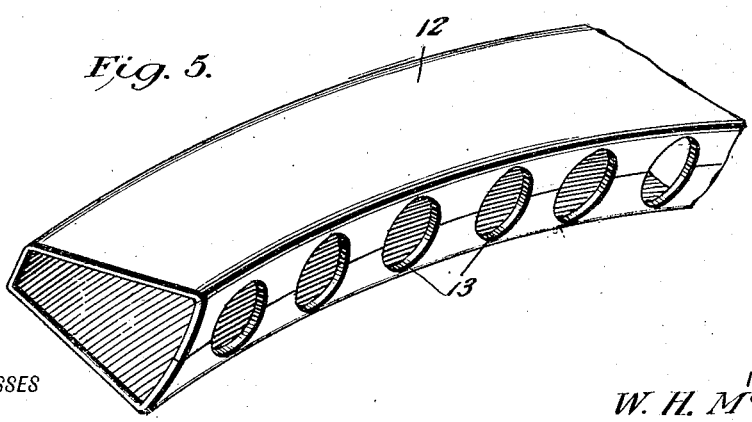
Fig. 5 is a perspective view of a portion of the inner support or filler, looking from the inside.

An annular support 12 is seated on the rim, the said support having a trapezoidal cross section. The inner face of the support is convex to fit the shoe or casing when in place on the rim, and the outer face is narrower than the inner face. The inner face, as shown in Fig. 5, is provided with openings 13 at close intervals, the said openings being of relatively large diameter, and in the present instance this support is formed by bending a strip of suitable material, the edges of the strip being at the center of the inner face of the support.

A series of laminated springs 14 is connected with the support 12. Each of the springs of the series consists of a number of laminæ, the number depending upon the weight the tire is to support, and the ends of the springs are secured to the opposite faces of the support, by riveting or the like.

In constructing the resilient filler for the tire, all of the springs may be riveted, except the last, which will necessarily be bolted, the ends being on the inner surface of the support. The openings 13 permit access to the interior of the support 12 for heading the rivets and for placing the nuts on the bolts. Normally, the springs 14 occupy the position of Fig. 3, holding the shoe or casing expanded. Each spring is approximately a circle, and the ends are bent up, as shown, to lie upon opposite faces of the support. When the casing is compressed the parts will take the position of Fig. 4, and the support 12 which extends slightly beyond the center of the shoe or casing, will limit the compressing movement of the springs.

I claim:

1. A filler for tires comprising an annular hollow support gradually increasing in width from its outer face toward its inner face, a series of arched springs connected with the support, each of said springs having its ends bent outward and lapped upon the opposite sides of the support and secured thereto, and a shoe or casing inclosing the support.

2. A filler for tires comprising an annular hollow support gradually increasing in width from its outer face toward its inner face, and a series of arched springs connected with the support, each of the said springs having its ends bent outward and lapped upon the opposite sides of the support and secured thereto, said support having openings at intervals on its inner face for the purpose specified.

3. A filler for tires comprising an annular hollow support gradually increasing in width from its outer face toward its inner face, and a series of arched springs connected with the support, each of said springs having its ends bent outward and lapped upon the opposite sides of the support and secured thereto.

4. A filler for tires comprising an annular hollow support gradually increasing in width from its outer face toward its inner face, and a series of arched springs connected with the support.

WILLIAM H. McGOWEN.